(12) United States Patent
Pei et al.

(10) Patent No.: US 10,942,616 B2
(45) Date of Patent: Mar. 9, 2021

(54) MULTIMEDIA RESOURCE MANAGEMENT METHOD AND APPARATUS, AND STORAGE MEDIUM

(71) Applicant: BEIJING XIAOMI MOBILE SOFTWARE CO., LTD., Beijing (CN)

(72) Inventors: Zetan Pei, Beijing (CN); Zhenzhou Lu, Beijing (CN); Huiying Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/585,916

(22) Filed: Sep. 27, 2019

(65) Prior Publication Data

US 2020/0210048 A1    Jul. 2, 2020

(30) Foreign Application Priority Data

Dec. 28, 2018 (CN) .......................... 201811620058.0

(51) Int. Cl.
*G06F 3/0481* (2013.01)
*G06F 40/30* (2020.01)
(Continued)

(52) U.S. Cl.
CPC ........ *G06F 3/04812* (2013.01); *G06F 3/0486* (2013.01); *G06F 3/04883* (2013.01); *G06F 9/543* (2013.01); *G06F 40/30* (2020.01)

(58) Field of Classification Search
CPC ...... G06F 3/04812; G06F 40/30; G06F 9/543; G06F 3/04883; G06F 3/0486
See application file for complete search history.

(56) References Cited

U.S. PATENT DOCUMENTS

2013/0125016 A1    5/2013    Pallakoff et al.
2013/0238312 A1    9/2013    Waibel
(Continued)

FOREIGN PATENT DOCUMENTS

CN    103369048 A    10/2013
CN    107465949 A    12/2017
(Continued)

OTHER PUBLICATIONS

First Office Action issued to Chinese Application No. 201811620058.0, dated Aug. 25, 2020 with English translation, (16p).
(Continued)

*Primary Examiner* — Phuong H Nguyen
(74) *Attorney, Agent, or Firm* — Arch & Lake LLP

(57) ABSTRACT

The present disclosure relates to a multimedia resource management method and apparatus, and a storage medium. The method includes: displaying, when a preset trigger instruction for a first multimedia resource is received, a first floating window, the first floating window displaying the first multimedia resource in a thumbnail form; changing, when a movement instruction for the first floating window is received, a position of the first floating window based on an acquired movement trajectory; and performing, when a release instruction for the first floating window is received, a management operation on the first multimedia resource within the first floating window.

17 Claims, 25 Drawing Sheets

(51) Int. Cl.
    *G06F 3/0486*     (2013.01)
    *G06F 3/0488*     (2013.01)
    *G06F 9/54*       (2006.01)

(56)         References Cited

U.S. PATENT DOCUMENTS

2015/0009152 A1    1/2015   Tang et al.
2015/0082211 A1*   3/2015   Lee .......................... G06F 9/44
                                                              715/763
2016/0110350 A1    4/2016   Waibel
2017/0031530 A1    2/2017   Ikeda et al.
2017/0038892 A1    2/2017   Ikeda et al.
2017/0039030 A1    2/2017   Ikeda et al.
2017/0041581 A1    2/2017   Ikeda et al.
2017/0046326 A1    2/2017   Waibel
2018/0052571 A1*   2/2018   Seol ...................... G06F 3/0481
2018/0335937 A1*   11/2018  Hauenstein ........... G06F 3/0486
2019/0251156 A1    8/2019   Waibel
2020/0167068 A1*   5/2020   Tao ........................ G06F 3/048

FOREIGN PATENT DOCUMENTS

CN          108762954 A    11/2018
EP            3089011 A1   11/2016
WO         2004075169 A2    9/2004

OTHER PUBLICATIONS

European Search Report issued in European Application No. 19200084.2, dated Mar. 26, 2020, (23p).

* cited by examiner

MULTIMEDIA RESOURCE MANAGEMENT METHOD AND APPARATUS, AND STORAGE MEDIUM

CROSS-REFERENCE TO RELATED APPLICATION

This application is based on and claims priority to Chinese Patent Application No. 201811620058.0, filed on Dec. 28, 2018, the entire contents of which are incorporated herein by reference.

TECHNICAL FIELD

The present disclosure relates to the technical field of electronics, and more particularly, to a multimedia resource management method and apparatus, and a storage medium.

BACKGROUND

In daily work and life, we often encounter such a scenario in which users need to manage multimedia resources such as text, shopping links, audio and video links, files or pictures through terminals. For example, a user shares multimedia resources with others through a terminal to meet information spread demands.

As an example, a multimedia resource may be a shopping link and the shopping link is shared to others. In order to implement sharing of the shopping link, a user usually needs to perform the following operations: selecting the shopping link→clicking on a copy option to copy the shopping link to a pasteboard→selecting a sharing object with which the shopping link is to be shared→pasting the shopping link→clicking on a sending option to send the shopping link to the sharing object.

SUMMARY

According to a first aspect of the present disclosure, there is provided a multimedia resource management method, including: when a preset trigger instruction for a first multimedia resource is received, displaying a first floating window, the first floating window displaying the first multimedia resource in a thumbnail form; when a movement instruction for the first floating window is received, changing a position of the first floating window based on an acquired movement trajectory; and when a release instruction for the first floating window is received, performing a management operation on the first multimedia resource within the first floating window.

According to a second aspect of the present disclosure, there is provided a multimedia resource management apparatus, including a processor, a display screen and a memory configured to store an instruction executable by the processor, where the processor is configured to: when a preset trigger instruction for a first multimedia resource is received, cause the display screen to display a first floating window, the first floating window displaying the first multimedia resource in a thumbnail form; when a movement instruction for the first floating window is received, change a position of the first floating window based on an acquired movement trajectory; and when a release instruction for the first floating window is received, perform a management operation on the first multimedia resource within the first floating window.

According to a third aspect of the present disclosure, there is provided a non-transitory storage medium having stored thereon computer program instructions that, when executed by a processor, cause the processor to implement a multimedia resource management method, the method including: when a preset trigger instruction for a first multimedia resource is received, displaying a first floating window, the first floating window displaying the first multimedia resource in a thumbnail form; when a movement instruction for the first floating window is received, changing a position of the first floating window based on an acquired movement trajectory; and when a release instruction for the first floating window is received, performing a management operation on the first multimedia resource within the first floating window.

It is to be understood that the above general descriptions and detailed descriptions below are only exemplary and explanatory and not intended to limit the present disclosure.

BRIEF DESCRIPTION OF DRAWINGS

The accompanying drawings, which are incorporated in and constitute a part of this specification, illustrate examples consistent with the disclosure and, together with the description, serve to explain the principles of the disclosure.

DETAILED DESCRIPTION

Reference is made in detail to exemplary aspects, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the disclosure. Instead, they are merely examples of apparatuses and methods consistent with aspects related to the disclosure.

The terminology used in the present disclosure is for the purpose of describing particular examples only and is not intended to limit the present disclosure. As used in this disclosure and the appended claims, the singular forms "a", "an", and "the" are intended to include the plural forms as well, unless the context clearly indicates otherwise. It should also be understood that the term "and/or" as used herein refers to and includes any and all possible combinations of one or more of the associated listed items.

It should be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
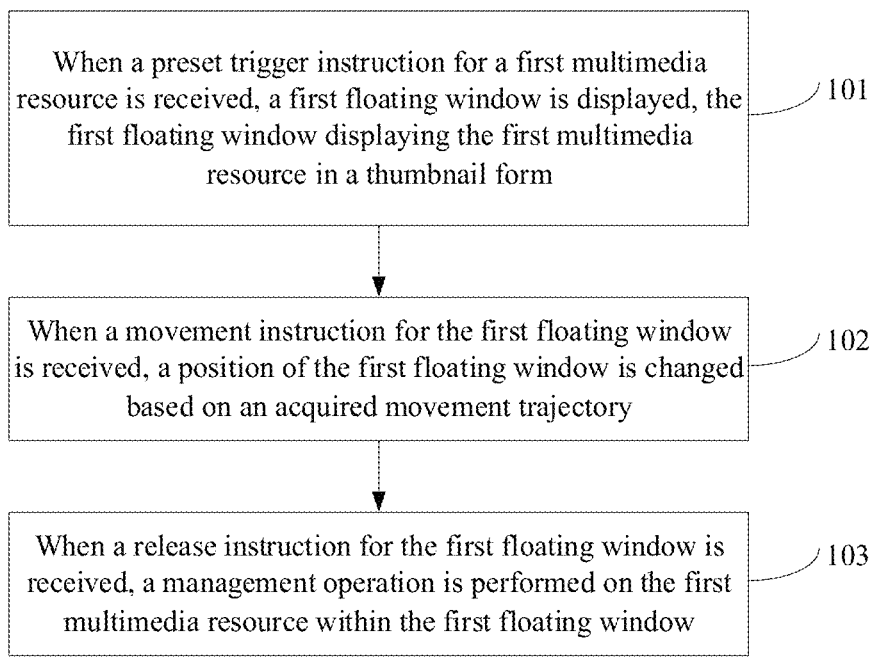
FIG. 1 is a flowchart of a multimedia resource management method according to an example.

FIG. 1 is a flowchart of a multimedia resource management method according to an example. As shown in FIG. 1, the method is applied to a terminal, and includes the following steps.

In step 101, when a preset trigger instruction for a first multimedia resource is received, a first floating window is displayed, the first floating window displaying the first multimedia resource in a thumbnail form.

In step 102, when a movement instruction for the first floating window is received, a position of the first floating window is changed based on an acquired movement trajectory.

In step 103, when a release instruction for the first floating window is received, a management operation is performed on the first multimedia resource within the first floating window.

According to the method provided by the examples of the present disclosure, when a preset trigger operation of a user on any multimedia resource is detected, the multimedia resource may be set in a floating state, that is, a floating window that is convenient for the user to operate may be displayed, and the floating window displays the multimedia resource in a thumbnail form. In addition, the multimedia resource in the floating state can also respond to operations of the user such as movement and release operations, to support a terminal to manage the multimedia resource based on the gesture operation of the user. Thus, the management method has a direct, convenient and simple operation mode, and can be directly implemented based on a gesture operation, resulting in high management efficiency. For example, for a resource sharing scenario, the resource sharing efficiency can be significantly improved, a management mode of multimedia resources is enriched, and the effect is better.

In a possible implementation, the step of performing, when the release instruction for the first floating window is received, the management operation on the first multimedia resource within the first floating window includes that:

when the release instruction is received after the first floating window is moved to a location of a resource collection container, the first multimedia resource is stored to the resource collection container.

In a possible implementation, the step of displaying, when the preset trigger instruction for the first multimedia resource is received, the first floating window includes that:

when a floating instruction for the first multimedia resource is received, the first floating window is displayed, the floating instruction being generated after the first multimedia resource is pressed for a duration longer than a preset duration; and/or, when a download instruction for the first multimedia resource is received, the first floating window is displayed; and/or, when a copy instruction for the first multimedia resource is received, the first floating window is displayed.

In a possible implementation, the step of displaying, when the floating instruction for the first multimedia resource is received, the first floating window includes that:

when the first multimedia resource is a voice resource, voice recognition is performed on the voice resource after the floating instruction is received, and the first floating window containing an obtained voice recognition result is displayed.

In a possible implementation, the movement instruction may include a first movement instruction, and the step of changing, when the movement instruction for the first floating window is received, the position of the first floating window based on the acquired movement trajectory may include that:

when a first gesture operation is detected, an information interaction page of a target application is displayed, the information interaction page being a page for information interaction with a sharing object, which may be a sharing recipient, with which the first multimedia resource is to be shared; and when the first movement instruction is received, the position of the first floating window on the information interaction page is changed based on an acquired first movement trajectory.

The release instruction may include a first release instruction, and the step of performing, when the release instruction for the first floating window is received, the management operation on the first multimedia resource within the first floating window may include that: when the first release instruction is received, the first multimedia resource is sent to the sharing object.

In a possible implementation, the movement instruction includes a second movement instruction, and the step of changing, when the movement instruction for the first floating window is received, the position of the first floating window based on an acquired movement trajectory includes that:

when a second gesture operation is detected, the first floating window is displayed on a first screen, and an information interaction page of a target application is displayed on a second screen; and when the second movement instruction is received, the first floating window is moved from the first screen to the second screen based on an acquired second movement trajectory;

where the release instruction includes a second release instruction, and the step of performing, when the release instruction for the first floating window is received, the management operation on the first multimedia resource within the first floating window includes that: when the second release instruction is received, the first multimedia resource is sent to a sharing object with which the first multimedia resource is to be shared for information interaction.

In a possible implementation, the method further includes that:

at least one application shortcut entry is displayed; and where the release instruction includes a third release instruction, and the step of performing, when the release instruction for the first floating window is received, the management operation on the first multimedia resource within the first floating window includes that:

when the third release instruction is received after the first floating window is moved to a location of an application shortcut entry of a target application, an information interaction page of the target application is displayed, and the first multimedia resource is sent to a sharing object with which the first multimedia resource is to be shared for information interaction.

In a possible implementation, the method further includes that:

the resource collection container and stored floating windows are displayed sequentially in a first screen edge area; and when a movement instruction for the resource collection container and a displayed floating window queue is received, the resource collection container and the floating window queue are displayed in a second screen edge area.

In a possible implementation, the method further includes that:

when a movement instruction for the first floating window of the floating window queue is received on an information interaction page of a target application, the first floating window is moved on the information interaction page, and an identifier used to prompt for sending is displayed on the first floating window; and when a release instruction for the first floating window is received, a first multimedia resource within the first floating window is sent to a sharing object with which the first multimedia resource is to be shared for information interaction.

In a possible implementation, the method further includes that:

an entry for deletion is displayed on the information interaction page; and when a deletion instruction for the first floating window is received at a location of the entry for deletion, the first floating window is deleted.

In a possible implementation, the step of displaying, when the preset trigger instruction for the first multimedia resource is received, the first floating window includes that:

when the first multimedia resource is a text resource and the text resource includes a key word, semantic analysis is performed on the text resource after a copy instruction for the text resource is received, to obtain at least one key word; and the first floating window containing the at least one key word is displayed.

All of the above optional implementations may be combined in any possible combinations to form optional aspects of the present disclosure, and will not be further described herein.

Figure 2:
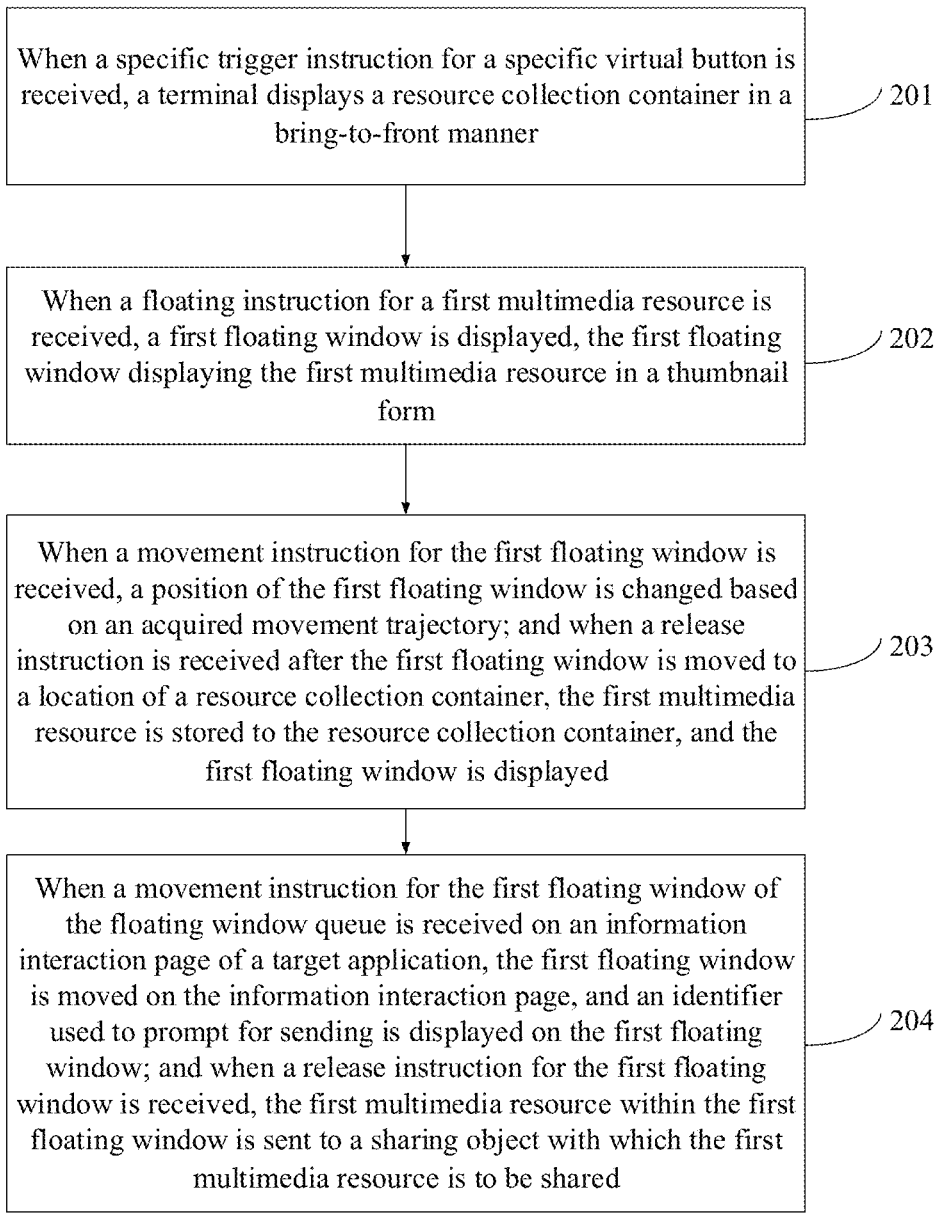
FIG. 2 is a flowchart of a multimedia resource management method according to an example.

FIG. 2 is a flowchart of a multimedia resource management method according to an example. As shown in FIG. 2, the method is applied to a terminal, and includes the following steps.

In step 201, when a specific trigger instruction for a specific virtual button is received, the terminal displays a resource collection container in a bring-to-front manner.

During the process of browsing multimedia resources, users often need to share multimedia resources. For example, a passage or paragraph needs to be forwarded. To facilitate user operations, the examples of the present disclosure provide a fast and convenient multimedia resource sharing mode for floating multimedia resources. The multimedia resources include, but are not limited to, text, links, files, pictures, and the like.

Figure 3:
FIG. 3 is a schematic diagram of a terminal display interface according to an example.

In the examples of the present disclosure, the specific virtual button is a function switch that enables global content floating. For example, the setting position of the specific virtual button may be a system notification bar, which is not specifically limited in the examples of the present disclosure. When the terminal receives a trigger instruction of a user for the specific virtual button, that is, after the user turns on the switch, the terminal enters a content collection state. Referring to FIG. 3, a resource collection container for collecting multimedia resources appears on a terminal screen. The resource collection container is also referred to herein as a global floating container. The resource collection container may be displayed at any position of a display screen, and the examples of the present disclosure also do not specifically limit this.

Here, the bring-to-front manner means that the resource collection container is displayed at the forefront when it is displayed in the foreground, that is, as shown in FIG. 3, displayed at the front end of all the pages, or on the top of all the pages.

The resource collection container may display a prompt message prompting the user to temporarily store multimedia resources, where the prompt message may be words such as "drag it here for temporary storage", and the examples of the present disclosure do not specifically limit.

In step 202, when a floating instruction for a first multimedia resource is received, a first floating window is displayed, the first floating window displaying the first multimedia resource in a thumbnail form.

The first multimedia resource may be any one of the multimedia resources on the currently displayed page, which is not specifically limited in the examples of the present disclosure. In the examples of the present disclosure, the floating instruction is generally generated or triggered by a long press operation on the first multimedia resource by the user, that is, the floating instruction is generated by the terminal after the user presses the first multimedia resource for a duration longer than a preset duration. The preset duration may be 2 or 3 seconds. In another way, when the user presses any multimedia resource, the multimedia resource may float and may be attached to the finger of the user. That is, the long press operation triggers the display of the floating window, and the floating window displays the multimedia resource in a thumbnail form.

It is to be noted that, for a text type multimedia resource, the thumbnail form may be a title of the passage or some words at the beginning of the passage; for a picture type multimedia resource, the thumbnail form may be a thumbnail of the picture.

Figure 4:
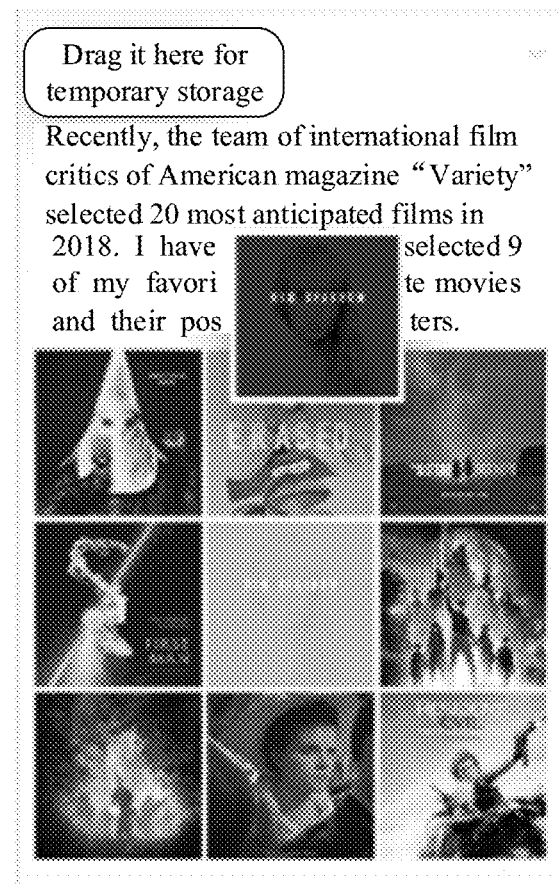
FIG. 4 is a schematic diagram of another terminal display interface according to an example.

For example, referring to FIG. 4, after detecting a long press operation of a picture by a user, the terminal directly places the picture in a floating state, which is also referred to herein as a floating window displaying the picture, and the floating window supports a user drag operation.

In step 203, when a movement instruction for the first floating window is received, a position of the first floating window is changed based on an acquired movement trajectory; and when a release instruction is received after the first floating window is moved to a location of a resource collection container, the first multimedia resource is stored to the resource collection container, and the first floating window is displayed.

Since the resource collection container is used for temporarily storing multimedia resources, any multimedia resource in the floating state can be moved to the resource collection container for temporary storage.

For example, as shown in FIG. 4, after a picture in the floating state is attached to the finger of the user, the user can arbitrarily move the floating picture, that is, a floating window, on a current page. When the floating window is moved to the location of the resource collection container, if a release instruction of the user for the floating window is detected, the picture may be temporarily stored in the resource floating container. In another way, after the user stops moving and loosens (i.e. releases) the finger, the picture can be placed in the resource collection container for storage.

Figure 5:
FIG. 5 is a schematic diagram of another terminal display interface according to an example.

In the examples of the present disclosure, displaying the first floating window includes, but is not limited to, displaying the first floating window on a position other than the location of the resource collection container on the current page. For example, referring to FIG. 5, the floating window and the resource collection container are displayed on the same page, and the resource collection container is located below the floating window, and prompts the user to continue to move other multimedia resources for temporary storage. That is, after a multimedia resource is put into the resource collection container, on the display level, the corresponding floating window is still in a floating display state, so that the user can perform operations such as sharing.

Figure 6:
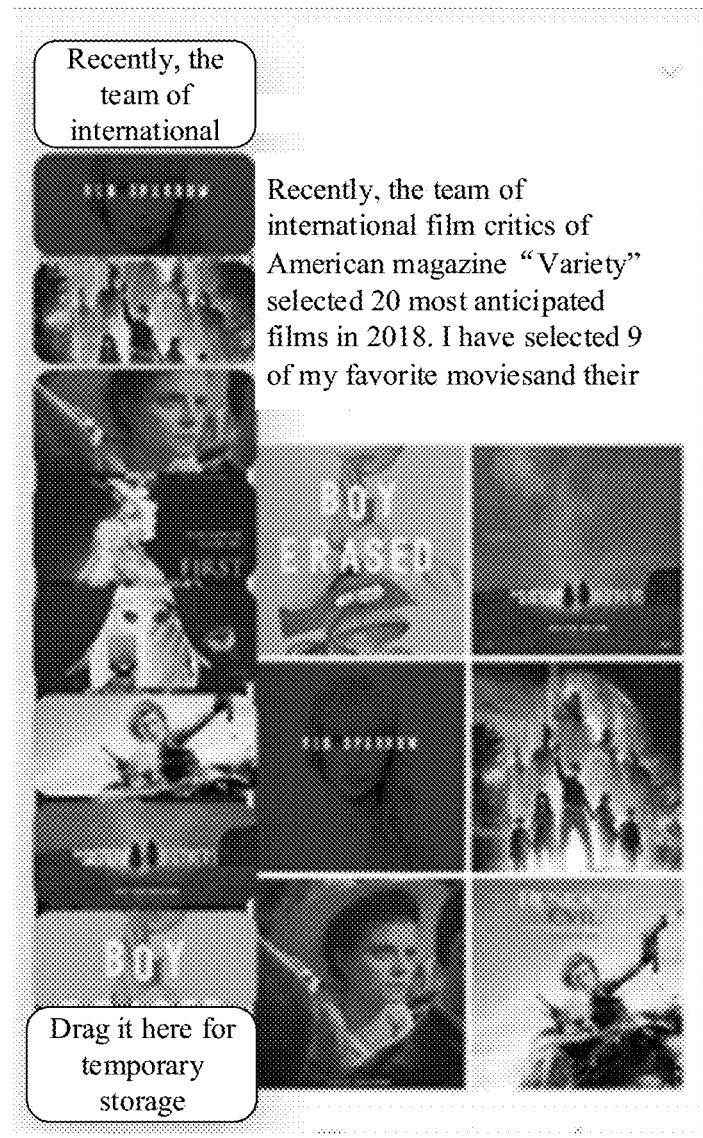
FIG. 6 is a schematic diagram of another terminal display interface according to an example.

In a possible implementation, the user may also move more multimedia resources into the resource collection container to form a floating window queue including at least two floating windows as shown in FIG. 6. The floating window queue may include a floating window in the form of text and/or a floating window in the form of a picture.

Further, in order not to affect the display effect of the display screen, the page displayed may not be excessively covered to facilitate the operation of the user. In the examples of the present disclosure, the resource collection container and the floating window queue are sequentially displayed in a first screen edge area. The first screen edge area may be a left edge, a right edge, an upper edge or a lower edge of the display screen, which is not specifically limited in the examples of the present disclosure.

For example, referring to FIG. 6, the manner of sequential display may be: for a floating window queue, each floating window is displayed in an order from top to bottom in a chronological order, and the resource collection container is located below the floating window queue, that is, the resource collection container is displayed outside of the floating window queue.

In step 204, when a movement instruction for the first floating window of the floating window queue is received on an information interaction page of a target application, the first floating window is moved on the information interaction page, and an identifier used to prompt for sending is displayed on the first floating window; and when a release instruction for the first floating window is received, the first multimedia resource within the first floating window is sent to a sharing object with which the first multimedia resource is to be shared for information interaction.

The information interaction page is a page for performing information interaction with the sharing object, that is, an application interface for sending a multimedia resource. In addition, if a target application is a social type application, the sharing object may be a friend of the local user.

Figure 7:
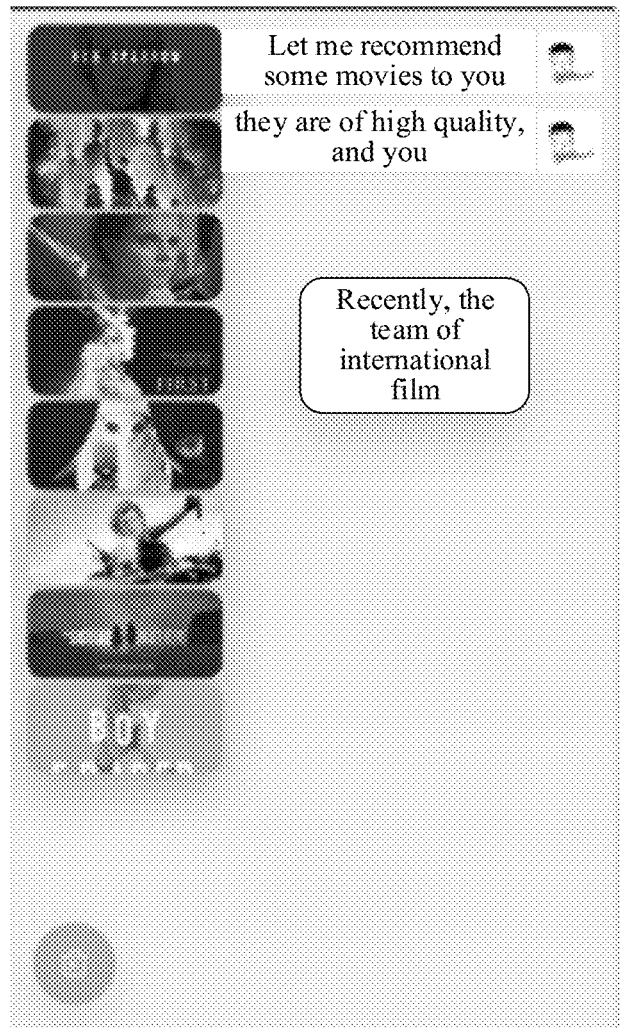
FIG. 7 is a schematic diagram of another terminal display interface according to an example.
Figure 18:
FIG. 18 is a schematic diagram of another terminal display interface according to an example.

For example, referring to FIG. 7, after the terminal switches to the application interface for sending the multimedia resource, the floating window queue shown in FIG. 6 is still displayed at the forefront, and the terminal supports the user to long press any floating window to drag the floating window out of the floating window queue to be moved on the application interface. As shown in FIG. 7, after the user selects the first floating window and drags it out of the floating window queue, an identifier used to prompt for sending appears in the upper right corner of the first floating window (as shown in FIG. 18), and the user can complete sending of the multimedia resource in the first floating window after loosening or releasing.

Figure 8:
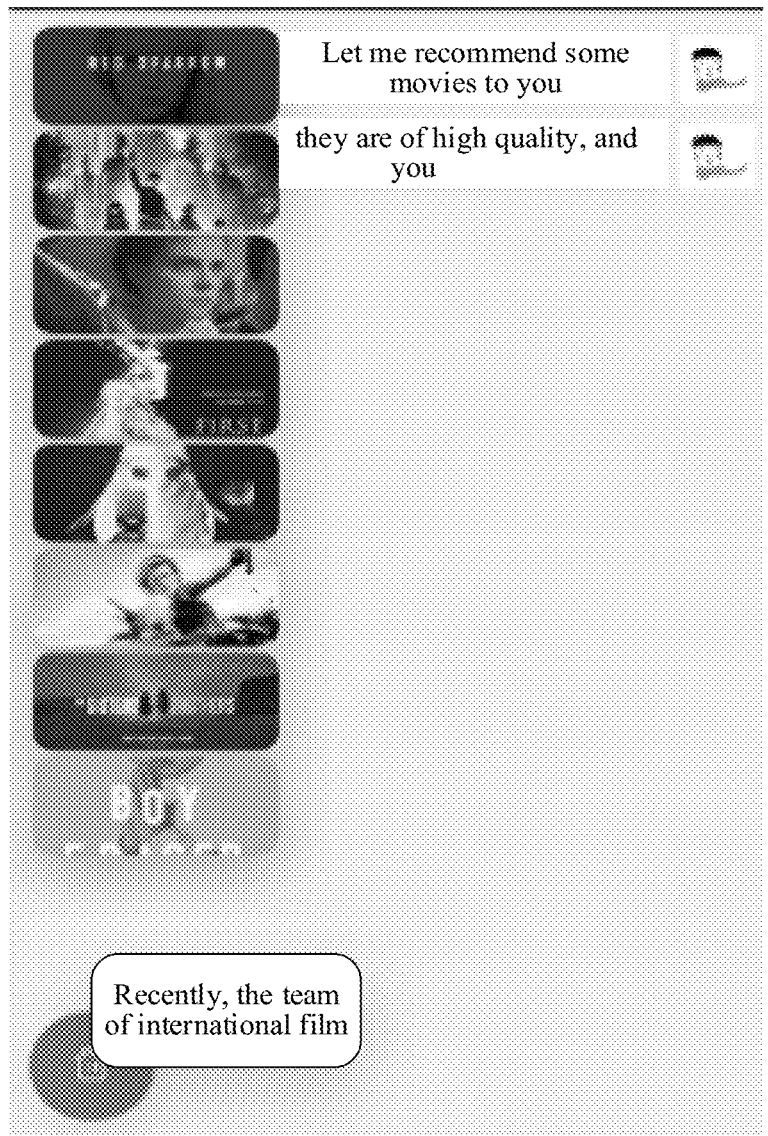
FIG. 8 is a schematic diagram of another terminal display interface according to an example.

In a possible implementation, the examples of the present disclosure also support deleting any one of floating windows in the floating window queue. For example, when the user selects the first floating window and drags it out of the floating window queue, an entry for deletion as shown in FIG. 8 is displayed on an information interaction page; and when the first floating window is moved to the location of the entry for deletion as shown in FIG. 8 and a deletion instruction for the first floating window is received at the location of the entry for deletion, the first floating window is deleted. For example, the deletion instruction is triggered by a release operation at the entry for deletion.

In a possible implementation, the examples of the present disclosure also support adjusting a display position of each floating window in the floating window queue. That is, when the terminal receives a movement instruction for any floating window in the floating window queue, the display position of the floating window in the floating window queue is adjusted. For example, during the process of moving the floating window, a distance between the floating window and other floating window displayed in the current order is acquired; and when the distance is less than a preset threshold, the display position of the floating window in the floating window queue is adjusted.

Figure 9:
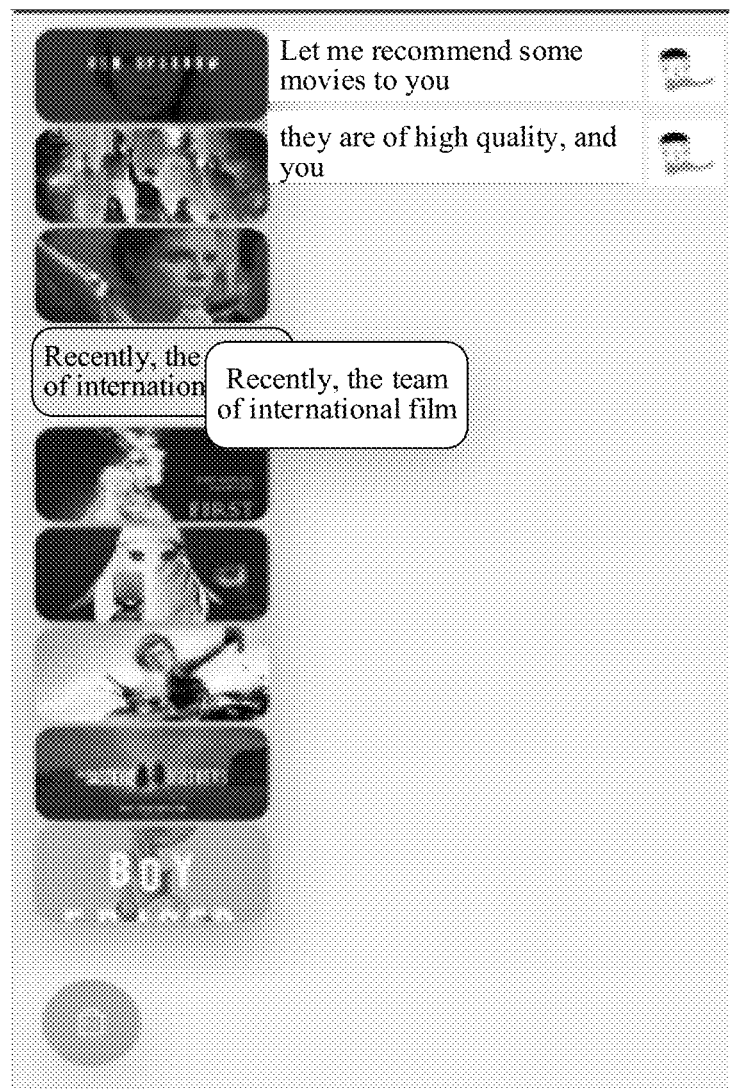
FIG. 9 is a schematic diagram of another terminal display interface according to an example.

For example, as shown in FIG. 9, when the user selects a floating window and moves it in the floating window queue, the order of the floating window may be adjusted. For example, the user selects the fourth floating window in the floating window queue shown in FIG. 9, and distances from the dragged fourth floating window to the first floating window and the second floating window are both less than a preset threshold, so the fourth floating window is inserted and displayed between the first floating window and the second floating window.

Figure 10:
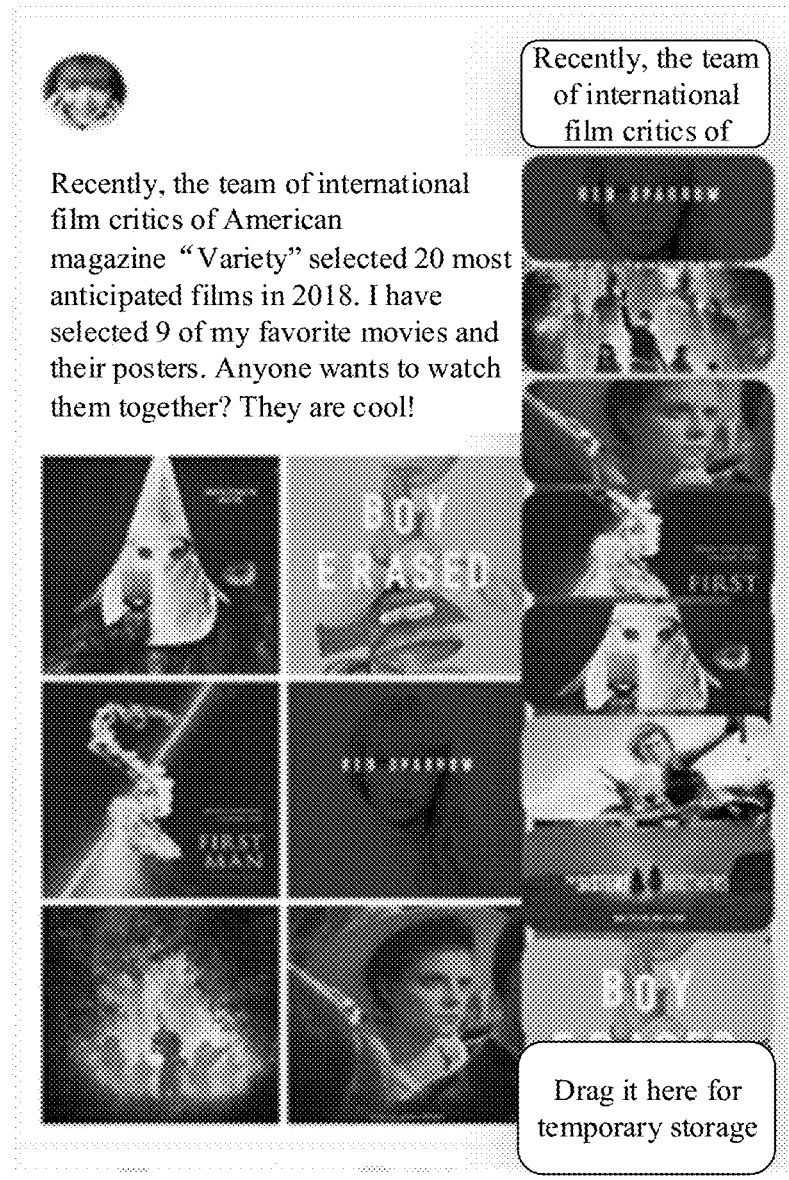
FIG. 10 is a schematic diagram of another terminal display interface according to an example.

In a possible implementation, the examples of the present disclosure also support moving the floating window queue. That is, when a movement instruction for the resource collection container and a displayed floating window queue is received, the resource collection container and the floating window queue are displayed in a second screen edge area. The second screen edge area may be a left edge, a right edge, an upper edge or a lower edge of the display screen, which is not specifically limited in the examples of the present disclosure. For example, as shown in FIG. 10, the second screen edge area corresponds to the first screen edge area, for example, the first screen edge area is the left edge and the second screen edge area is the right edge. The above movement instruction may be triggered by a left-right swipe operation performed by the user. That is, the examples of the present disclosure support the user to perform the left-right swipe operation to change the display position of the floating window queue so as to be attached to the left or right side of the display screen, and thus, the page displayed by the lower layer is not covered.

According to the method provided by the examples of the present disclosure, when a preset trigger operation of a user on any multimedia resource is detected, the multimedia resource may be set in a floating state, that is, a floating window that is convenient for the user to operate may be displayed, and the floating window displays the multimedia resource in a thumbnail form. In addition, the multimedia resource in the floating state can also respond to operations of the user such as movement and release operations, to support a terminal to manage the multimedia resource based on the gesture operation of the user. Thus, the management method has a direct, convenient and simple operation mode, and can be directly implemented based on a gesture operation, resulting in high management efficiency. For example, for a resource sharing scenario, the resource sharing efficiency can be significantly improved, a management mode of multimedia resources is enriched, and the effect is better.

In another example, in addition to placing the first multimedia resource in the floating state by a long press operation, the examples of the present disclosure further support placing the first multimedia resource in the floating state based on other operations as follows.

Figure 11:
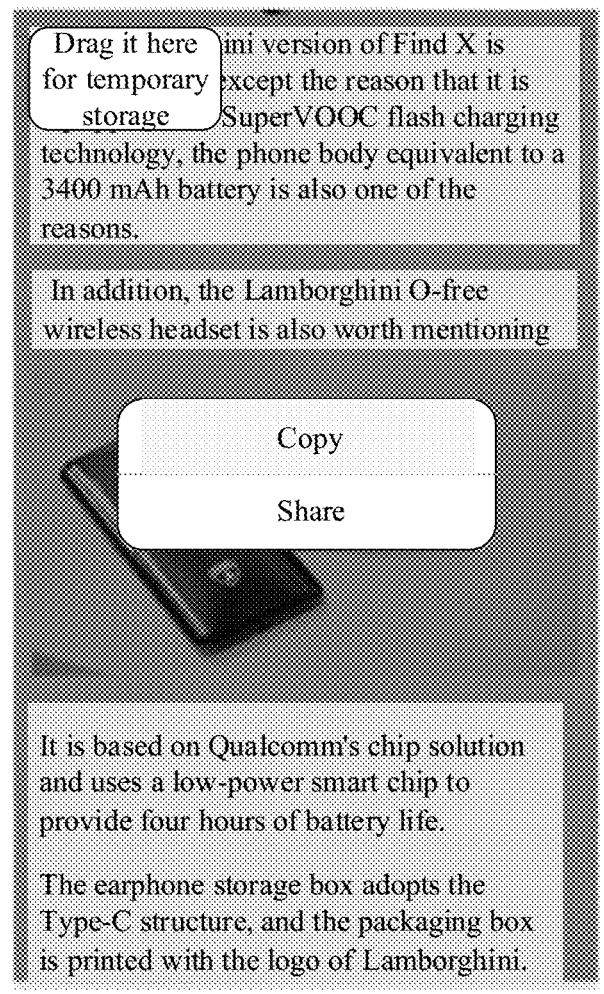
FIG. 11 is a schematic diagram of another terminal display interface according to an example.
Figure 12:
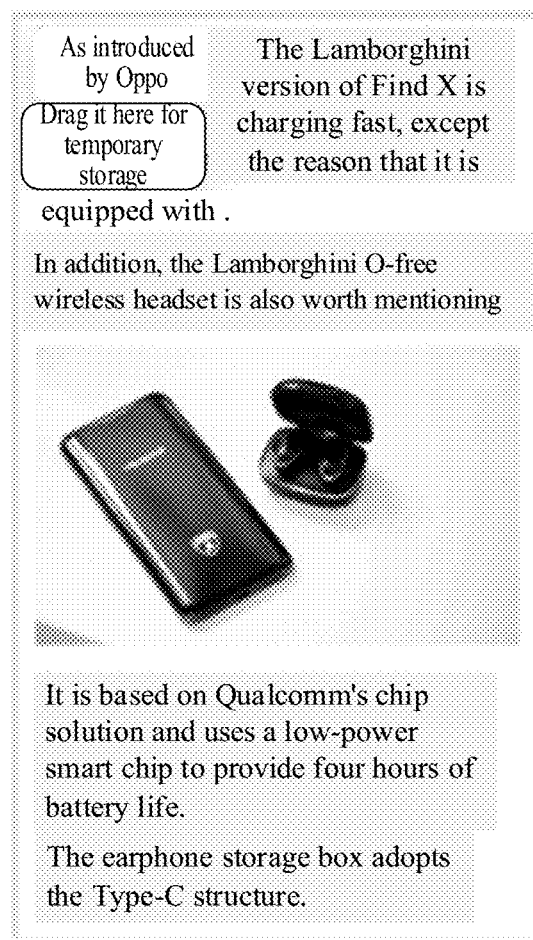
FIG. 12 is a schematic diagram of another terminal display interface according to an example.
Figure 13:
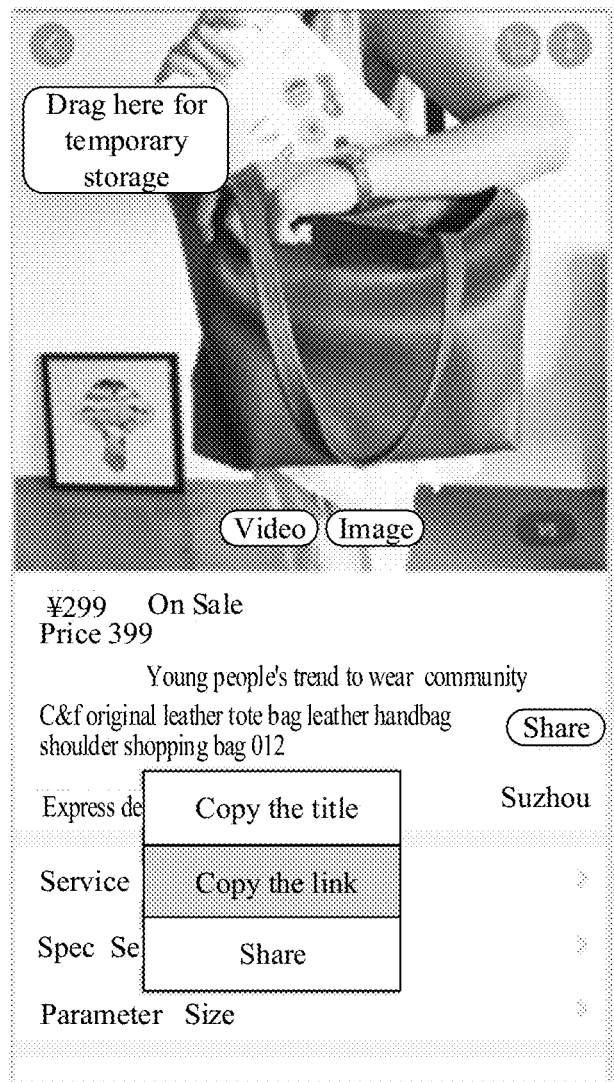
FIG. 13 is a schematic diagram of another terminal display interface according to an example.
Figure 14:
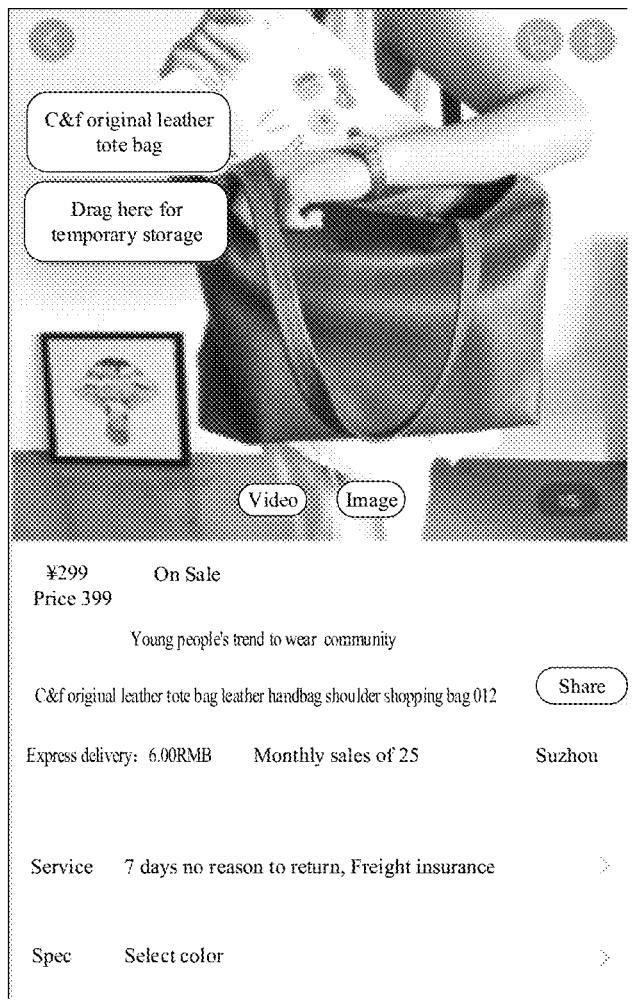
FIG. 14 is a schematic diagram of another terminal display interface according to an example.

In a possible implementation, when a copy instruction for the first multimedia resource is received, the first floating window is displayed. In Example 1, as shown in FIG. 11, when the terminal detects a copy operation on a passage by the user, a floating window is displayed as shown in FIG. 12. In addition, since the content of the passage is too long, the floating window of FIG. 12 only displays some words at the beginning of the passage. In Example 2, as shown in FIG. 13, when the terminal detects a link copying operation on a shopping page, another floating window is displayed as shown in FIG. 14. In addition, since the content of the link is too long, the floating window of FIG. 14 only displays part of the content of the link.

In another possible implementation, when a download instruction for the first multimedia resource is received, the terminal may also display the first floating window similarly. For example, when the terminal detects that the user clicks on a download button on a certain picture, the picture is placed in a floating state.

Figure 15:
FIG. 15 is a schematic diagram of another terminal display interface according to an example.
Figure 16:
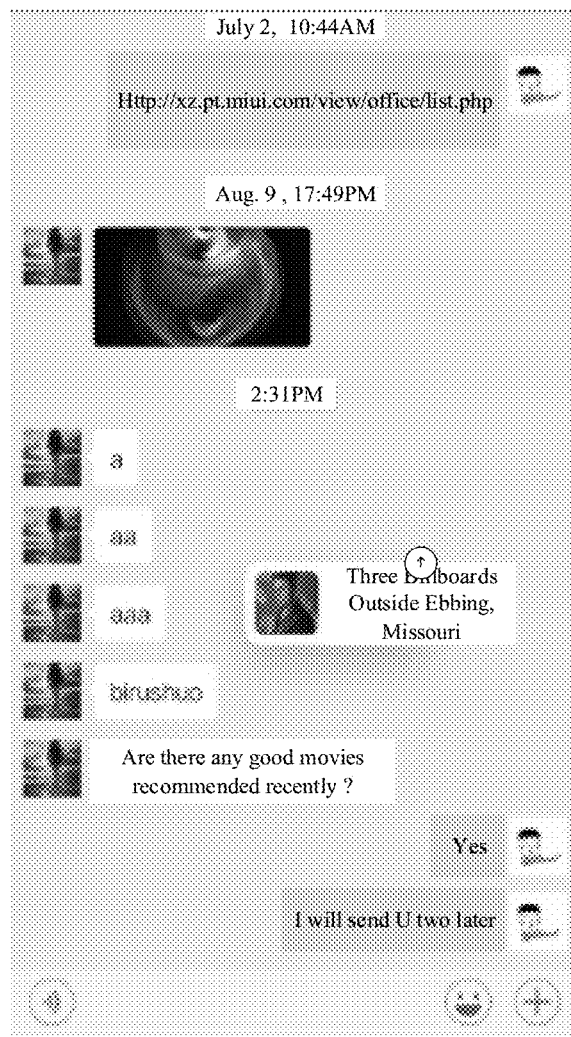
FIG. 16 is a schematic diagram of another terminal display interface according to an example.

In another possible implementation, in a scenario where a local user chats with a chatting robot, a voice resource returned by the chatting robot may also be placed in a floating state, that is, the step 202 of displaying, when the floating instruction for the first multimedia resource is received, the first floating window includes, but is not limited to: performing, when the first multimedia resource is a voice resource, voice recognition on the voice resource after the floating instruction is received, and displaying the first floating window containing an obtained voice recognition result. As shown in FIG. 15 and FIG. 16, for the voice resource, after the first floating window is displayed, the text content in the first floating window may be sent in the manner described above. It is to be noted that, referring to FIG. 15, if a floating window occupies a large page space, an abbreviated or thumbnail version of the floating window may be further displayed when the floating window is selected and dragged to move. The examples of the present disclosure do not specifically limit this.

The above floating instruction, copy instruction and download instruction are collectively referred to herein as a preset trigger instruction.

In another example, after the first multimedia resource is placed in the floating state, the examples of the present disclosure further support directly sending the first multimedia resource without temporarily storing in the resource collection container, where the sending manner includes, but is not limited to, the following manners.

Manner 1: Quickly Switch to a Target Application for Sending Based on Full Screen Gestures That is, the movement instruction includes a first movement instruction and the step of changing, when the movement instruction for the first floating window is received, the position of the first floating window based on the acquired movement trajectory includes: displaying, when a first gesture operation is detected, an information interaction page of a target application, the information interaction page being a page for information interaction with a sharing object with which the first multimedia resource is to be shared; and changing, when the first movement instruction is received, the position of the first floating window on the information interaction page based on an acquired first movement trajectory. Then, the step of performing, when the first release instruction for the first floating window is received, the management operation on the first multimedia resource within the first floating window includes: sending the first multimedia resource to the sharing object.

Figure 17:
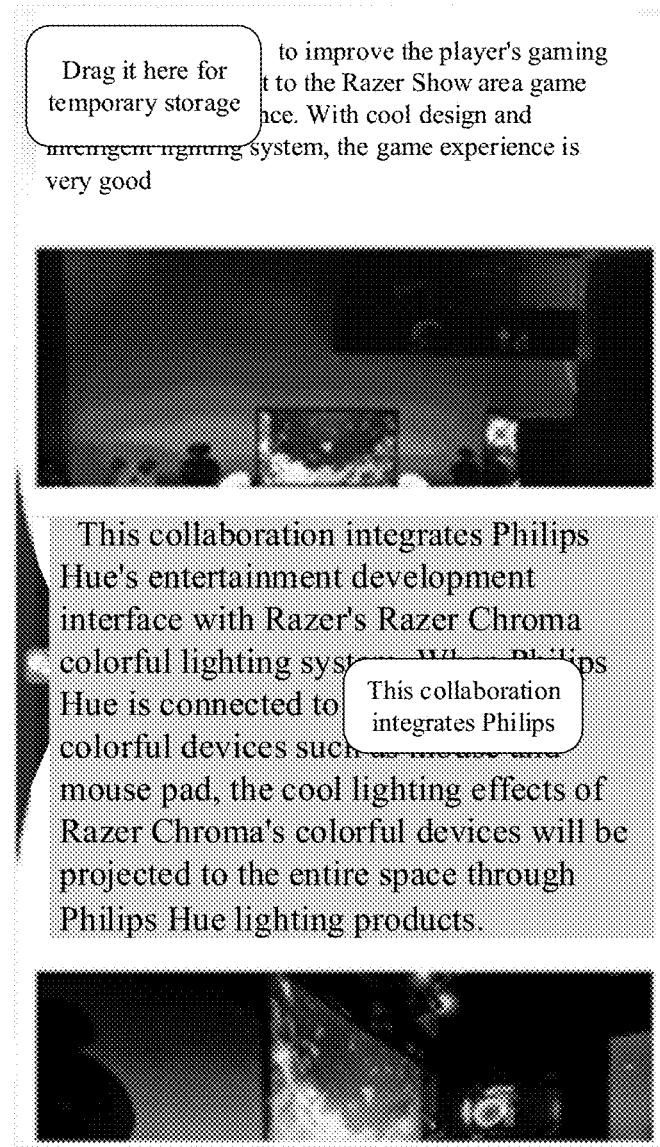
FIG. 17 is a schematic diagram of another terminal display interface according to an example.

As shown in FIG. 17, after the terminal detects that the user has copied a passage in a webpage and generates a floating window, the user can quickly switch to an information interaction page of the target application as shown in FIG. 18 by a full screen gesture of sliding to the right. After the page is switched, the subsequent mode of sending the multimedia resources is the same as that of the previous one, and will not be repeated herein.

Manner 2: Send Based on Split Screen

That is, the movement instruction includes a second movement instruction, and the step of changing, when the movement instruction for the first floating window is received, the position of the first floating window based on an acquired movement trajectory includes: displaying, when a second gesture operation is detected, the first floating window on a first screen, and displaying an information interaction page of a target application on a second screen; and moving, when the second movement instruction is received, the first floating window from the first screen to the second screen based on an acquired second movement trajectory. Then, the step of performing, when the second release instruction for the first floating window is received, the management operation on the first multimedia resource within the first floating window includes: sending the first multimedia resource to a sharing object with which the first multimedia resource is to be shared for information interaction.

Figure 19:
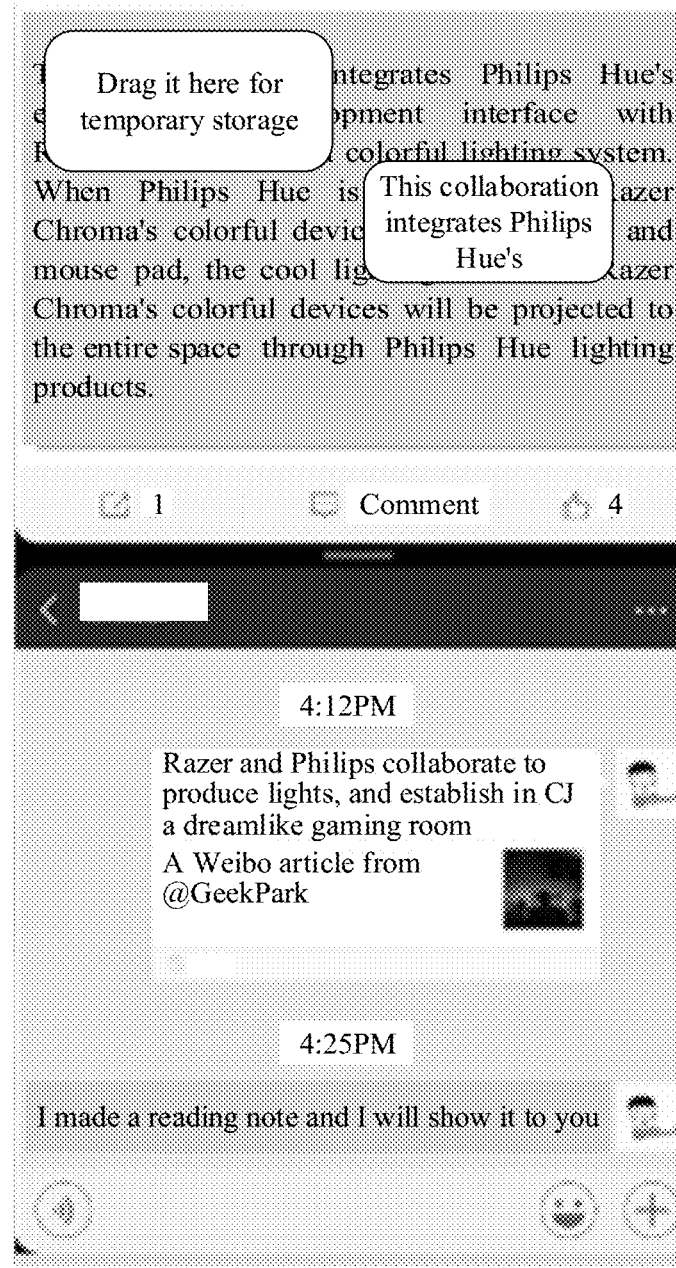
FIG. 19 is a schematic diagram of another terminal display interface according to an example.
Figure 20:
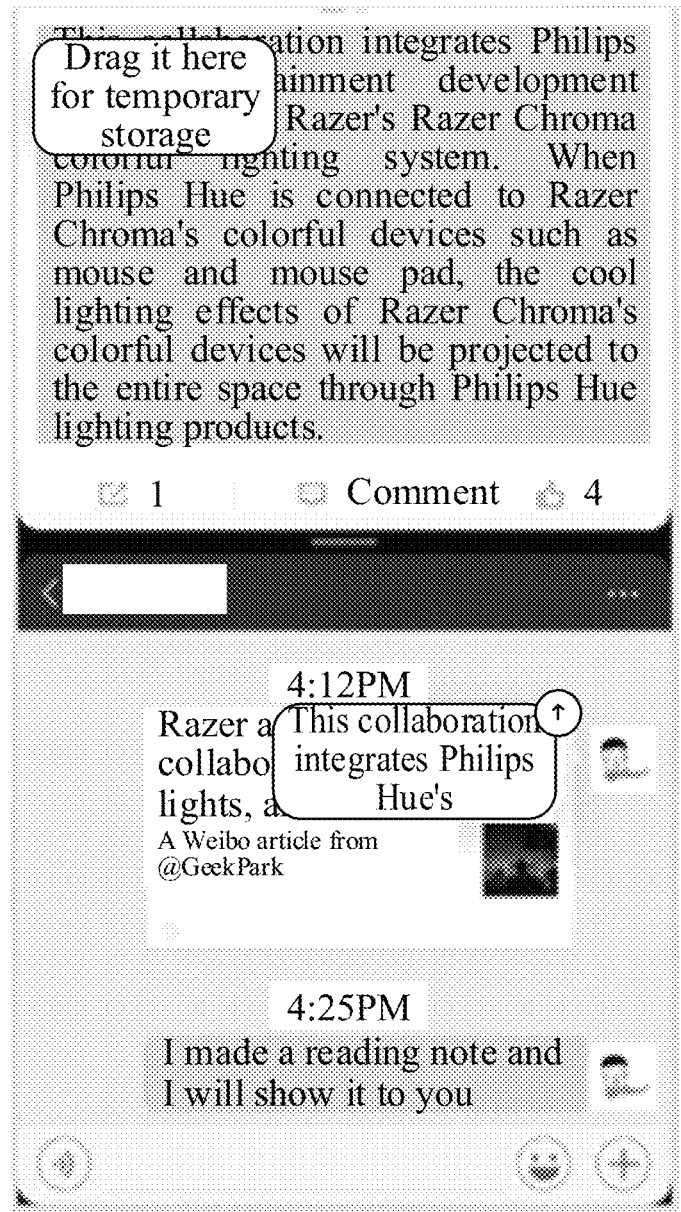
FIG. 20 is a schematic diagram of another terminal display interface according to an example.

The second gesture operation is different from the first gesture operation. For example, the first gesture operation is to lightly slide from the left side of the screen to the right side of the screen, and the second gesture operation may be to lightly slide from the top of the screen to the bottom of the screen, which is not specifically limited in the examples of the present disclosure. As shown in FIG. 19 and FIG. 20, the copied text, the generated floating window and the information interaction page of the target application are respectively displayed on two screens, and the split screen manner can realize quick movement of the floating window to the information interaction page.

Manner 3: Send Based on Application Shortcut Entry

That is, at least one application shortcut entry is displayed; and when a third release instruction for the first floating window is received after the first floating window is moved to a location of an application shortcut entry of a target application, the terminal displays an information interaction page of the target application, and sends the first multimedia resource to a sharing object with which the first multimedia resource is to be shared for information interaction.

Figure 21:
FIG. 21 is a schematic diagram of another terminal display interface according to an example.

The condition for displaying at least one application shortcut entry may be: detecting a long press operation on the first floating window, which is not specifically limited in the examples of the present disclosure. As shown in FIG. 21, at least one application shortcut entry may be displayed at the top of the screen or at the bottom of the screen. For example, at least one application shortcut entry is typically an application icon for an application that is used by the user frequently. For example, application icons of the top N applications used by the user frequently are displayed as the at least one application shortcut entry.

Figure 22:
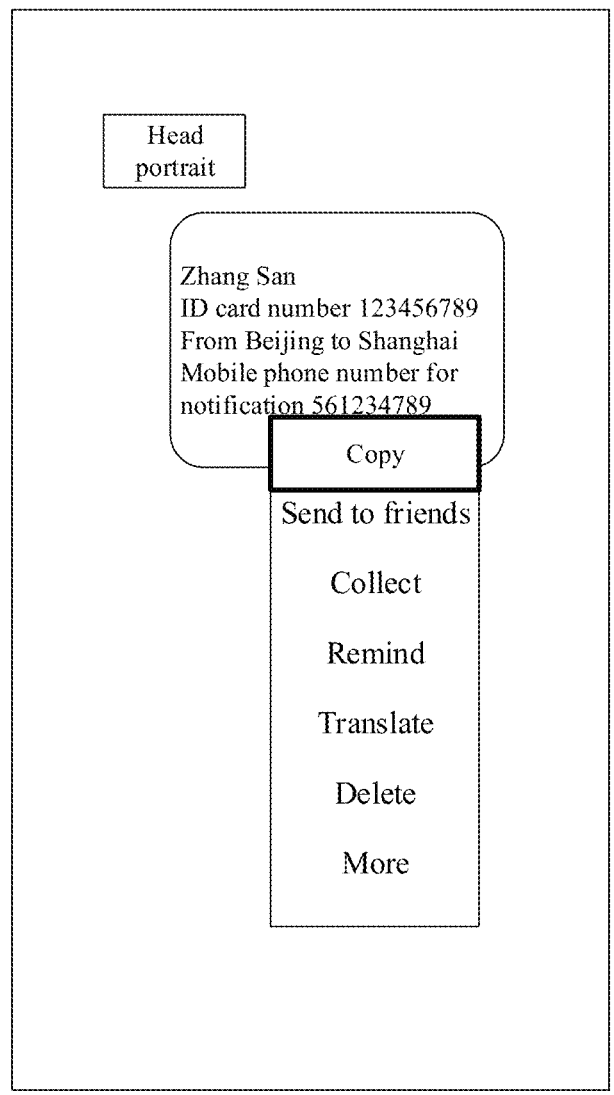
FIG. 22 is a schematic diagram of another terminal display interface according to an example.
Figure 23:
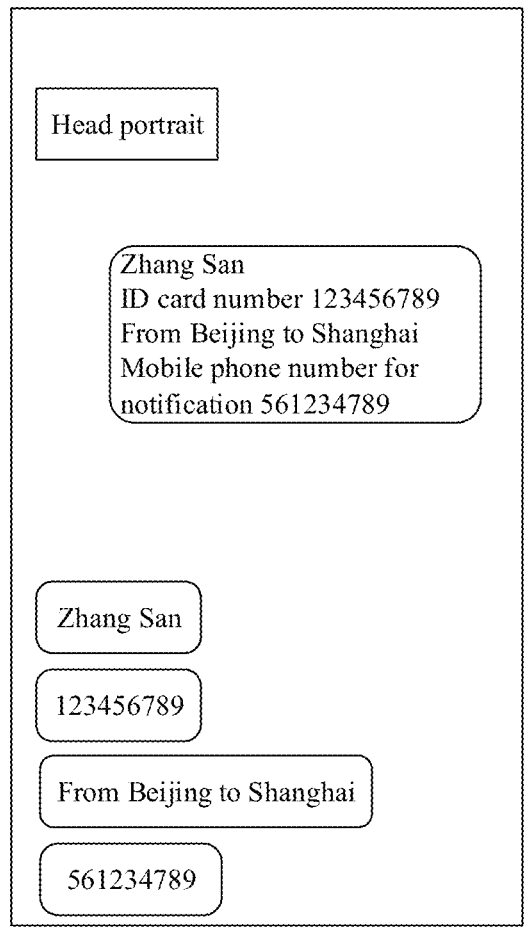
FIG. 23 is a schematic diagram of another terminal display interface according to an example.

In another example, for step 202, when the first multimedia resource is a text resource and the text resource includes a key word, semantic analysis is performed on the text resource after a copy instruction for the text resource is received, to obtain at least one key word; and the first floating window containing the at least one key word is displayed. For example, the first floating window may contain multiple windows, and one floating window may include a key word. The key word may be a name, an address, an ID number, a mobile phone number, etc., which is not specifically limited in the examples of the present disclosure. For example, referring to FIG. 22 and FIG. 23, for a passage sent by a friend on an information interaction page, when the terminal detects that the user performs a copy operation on the passage, the terminal splits or segments the passage through semantic analysis, and displays multiple floating windows based on a segmentation result, so as to facilitate the user to drag and fill in a form at a later stage, which is not specifically limited in the examples of the present disclosure.

According to the multimedia resource management mode provided by the examples of the present disclosure, a terminal may place multimedia resources in a floating state by detecting the user operations of copying, downloading, long-pressing and the like through a system-level content capturing capability, so that users can perform dragging or sending operations. The mode can be applied to a variety of scenarios, and significantly improves the resource sharing efficiency.

In detail, the examples of the present disclosure support the user to directly operate multimedia resources, and after the multimedia resources are placed in a floating state, the user can send the multimedia resources by a series of operations such as dragging, moving and releasing. The interaction mode conforms to human intuition, is very easy to learn and remember, and improves the user experience. In addition, the multimedia resource floating mode may be applied to multiple scenarios, which can help the user to facilitate gesture interaction, and significantly improves the resource sharing efficiency.

In addition, the mode of sharing multimedia resources by dragging and moving is more similar to the exchange of goods in the natural world, so the sharing mode is more natural, and is conducive to rapid popularization, facilitating the development of human-computer interaction. In addition, the sharing efficiency of the sharing mode is significantly improved.

Figure 24:
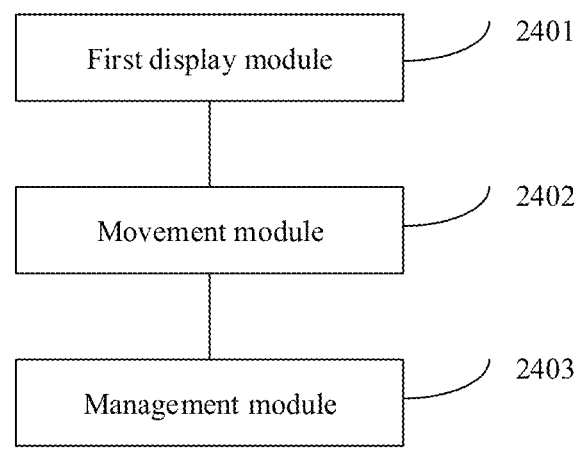
FIG. 24 is a block diagram of a multimedia resource management apparatus according to an example.

FIG. 24 is a block diagram of a multimedia resource management apparatus according to an example. Referring to FIG. 24, the apparatus includes a first display module 2401, a movement module 2402 and a management module 2403.

The first display module 2401 is configured to, when a preset trigger instruction for a first multimedia resource is received, display a first floating window, the first floating window displaying the first multimedia resource in a thumbnail form.

The movement module 2402 is configured to, when a movement instruction for the first floating window is received, change a position of the first floating window based on an acquired movement trajectory.

The management module 2403 is configured to, when a release instruction for the first floating window is received, perform a management operation on the first multimedia resource within the first floating window.

According to the apparatus provided by the examples of the present disclosure, when a preset trigger operation of a user on any multimedia resource is detected, the multimedia resource may be set in a floating state, that is, a floating window that is convenient for the user to operate may be displayed, and the floating window displays the multimedia resource in a thumbnail form. In addition, the multimedia resource in a floating state can also respond to operations of the user such as movement and release operations, to support a terminal to manage the multimedia resource based on the gesture operation of the user. Thus, the management method has a direct, convenient and simple operation mode, and can be directly implemented based on a gesture operation, resulting in high management efficiency. For example, for a resource sharing scenario, the resource sharing efficiency can be significantly improved, a management mode of multimedia resources is enriched, and the effect is better.

In a possible implementation, the management module is further configured to, when the release instruction is received after the first floating window is moved to a location of a resource collection container, store the first multimedia resource to the resource collection container.

In a possible implementation, the first display module is further configured to: when a floating instruction for the first multimedia resource is received, display the first floating window, the floating instruction being generated after the first multimedia resource is pressed for a duration longer than a preset duration; and/or, when a download instruction for the first multimedia resource is received, display the first floating window; and/or, when a copy instruction for the first multimedia resource is received, display the first floating window.

In a possible implementation, the first display module is further configured to, when the first multimedia resource is a voice resource, perform voice recognition on the voice resource after the floating instruction is received, and display the first floating window containing an obtained voice recognition result.

In a possible implementation, the movement instruction includes a first movement instruction, the release instruction includes a first release instruction, and the movement module is further configured to: when a first gesture operation is detected, display an information interaction page of a target application, the information interaction page being a page for information interaction with a sharing object with which the first multimedia resource is to be shared; and when the first movement instruction is received, change the position of the first floating window on the information interaction page based on an acquired first movement trajectory.

The management module is further configured to, when the first release instruction is received, send the first multimedia resource to the sharing object.

In a possible implementation, the movement instruction includes a second movement instruction, the release instruction includes a second release instruction, and the movement module is further configured to: when a second gesture operation is detected, display the first floating window on a first screen, and display an information interaction page of a target application on a second screen; and when the second movement instruction is received, move the first floating window from the first screen to the second screen based on an acquired second movement trajectory.

The management module is further configured to, when the second release instruction is received, send the first multimedia resource to a sharing object with which the first multimedia resource is to be shared for information interaction.

In a possible implementation, the release instruction includes a third release instruction, and the first display module is further configured to display at least one application shortcut entry.

The management module is further configured to, when the third release instruction is received after the first floating window is moved to a location of an application shortcut entry of a target application, display an information interaction page of the target application, and send the first multimedia resource to a sharing object with which the first multimedia resource is to be shared for information interaction.

In a possible implementation, the apparatus further includes a second display module.

The second display module is configured to: display the resource collection container and stored floating windows sequentially in a first screen edge area; and when a movement instruction for the resource collection container and a displayed floating window queue is received, display the resource collection container and the floating window queue in a second screen edge area.

In a possible implementation, the apparatus further includes a third display module.

The movement module is further configured to, when a movement instruction for the first floating window of the floating window queue is received on an information interaction page of a target application, move the first floating window of the floating window queue on the information interaction page of the target application.

The third display module is configured to display, on the first floating window of the floating window queue, an identifier used to prompt for sending.

The management module is further configured to, when a release instruction for the first floating window of the floating window queue is received, send a first multimedia resource within the first floating window of the floating window queue to a sharing object with which the first multimedia resource is to be shared for information interaction.

In a possible implementation, the first display module is further configured to display an entry for deletion on the information interaction page.

The management module is further configured to, when a deletion instruction for the first floating window is received at a location of the entry for deletion, delete the first floating window.

In a possible implementation, the first display module is further configured to: when the first multimedia resource is a text resource and the text resource includes a key word, perform semantic analysis on the text resource after a copy instruction for the text resource is received, to obtain at least one key word; and display the first floating window containing the at least one key word.

All of the above optional implementations may be combined in any possible combinations to form optional aspects of the present disclosure, and will not be further described herein.

With regard to the apparatus in the above examples, the specific manner in which the respective modules perform the operations has been described in detail in the example relating to the method, and will not be explained in detail herein.

Figure 25:
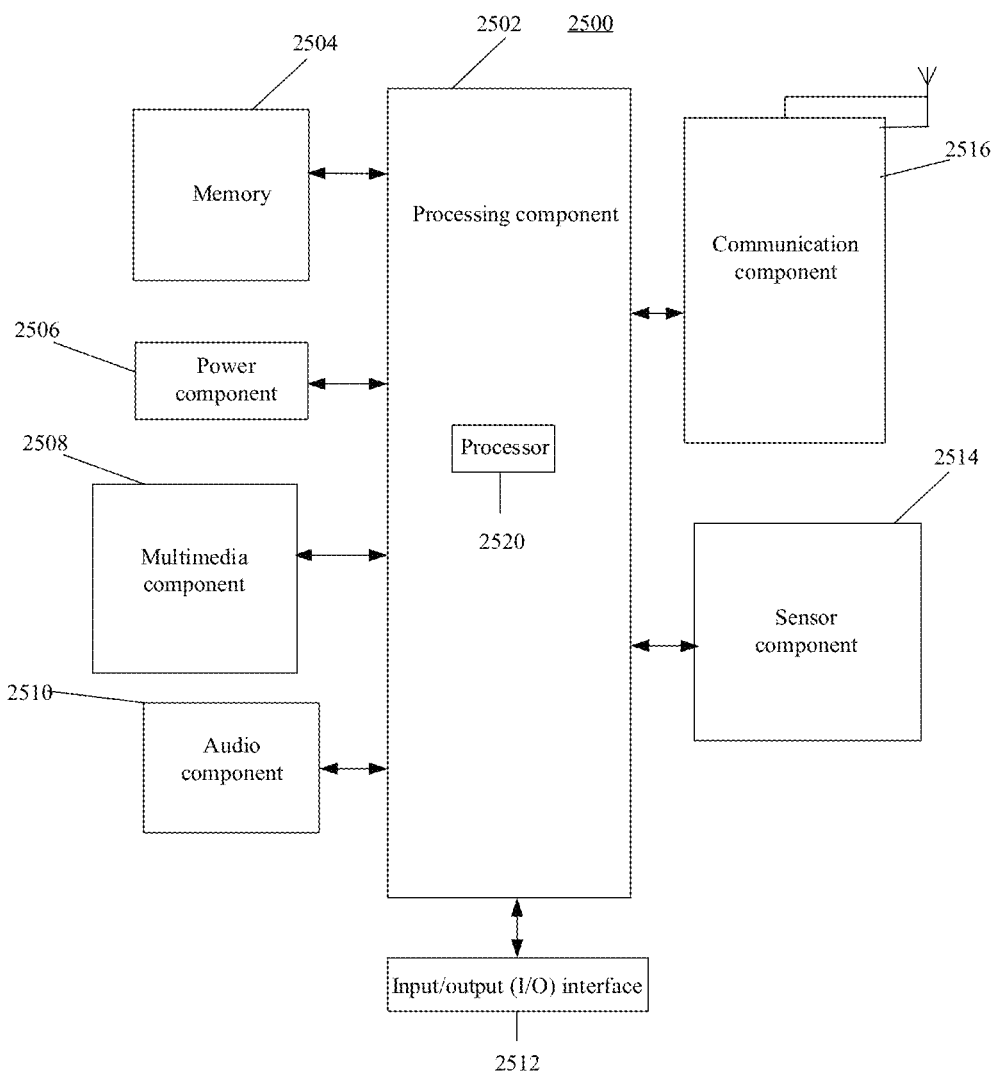
FIG. 25 is a block diagram of another multimedia resource management apparatus according to an example.

FIG. 25 is a block diagram of a multimedia resource management apparatus 2500 according to an example. For example, the apparatus 2500 may be a mobile phone, a computer, a digital broadcast terminal, a messaging device, a gaming console, a tablet, a medical device, exercise equipment, a personal digital assistant, and the like.

In some aspects, there is provided a multimedia resource management apparatus including: a processor; a display screen; and a memory configured to store an instruction executable by the processor, where the processor is configured to: when a preset trigger instruction for a first multimedia resource is received, cause the display screen to display a first floating window, the first floating window displaying the first multimedia resource in a thumbnail form; when a movement instruction for the first floating window is received, change a position of the first floating window based on an acquired movement trajectory; and when a release instruction for the first floating window is received, perform a management operation on the first multimedia resource within the first floating window.

Referring to FIG. 25, the apparatus 2500 may include one or more of the following components: a processing component 2502, a memory 2504, a power component 2506, a multimedia component 2508, an audio component 2510, an input/output (I/O) interface 2512, a sensor component 2514, and a communication component 2516.

The processing component 2502 typically controls overall operations of the apparatus 2500, such as the operations associated with display, telephone calls, data communications, camera operations, and recording operations. The processing component 2502 may include one or more processors 2520 to execute instructions to perform all or part of the steps in the above described methods. Moreover, the processing component 2502 may include one or more modules which facilitate the interaction between the processing component 2502 and other components. For example, the processing component 2502 may include a multimedia module to facilitate the interaction between the multimedia component 2508 and the processing component 2502.

The memory 2504 is configured to store various types of data to support the operation of the apparatus 2500.

Examples of such data include instructions for any applications or methods operated on the apparatus 2500, contact data, phonebook data, messages, pictures, video, etc. The memory 2504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2506 provides power to various components of the apparatus 2500. The power component 2506 may include a power management system, one or more power sources, and any other components associated with the generation, management, and distribution of power in the apparatus 2500.

The multimedia component 2508 includes a screen providing an output interface between the apparatus 2500 and the user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, the multimedia component 2508 includes a front camera and/or a rear camera. The front camera and the rear camera may receive an external multimedia datum while the apparatus 2500 is in an operation mode, such as a photographing mode or a video mode. Each of the front camera and the rear camera may be a fixed optical lens system or have focus and optical zoom capability.

The audio component 2510 is configured to output and/or input audio signals. For example, the audio component 2510 includes a microphone ("MIC") configured to receive an external audio signal when the apparatus 2500 is in an operation mode, such as a call mode, a recording mode, and a voice recognition mode. The received audio signal may be further stored in the memory 2504 or transmitted via the communication component 2516. In some examples, the audio component 2510 further includes a speaker to output audio signals.

The I/O interface 2512 provides an interface between the processing component 2502 and peripheral interface modules, such as a keyboard, a click wheel, buttons, and the like. The buttons may include, but are not limited to, a home button, a volume button, a starting button, and a locking button.

The sensor component 2514 includes one or more sensors to provide status assessments of various aspects of the apparatus 2500. For example, the sensor component 2514 may detect an open/closed status of the apparatus 2500, relative positioning of components, e.g., the display and the keypad, of the apparatus 2500, a change in position of the apparatus 2500 or a component of the apparatus 2500, a presence or absence of user contact with the apparatus 2500, an orientation or an acceleration/deceleration of the apparatus 2500, and a change in temperature of the apparatus 2500. The sensor component 2514 may include a proximity sensor configured to detect the presence of nearby objects without any physical contact. The sensor component 2514 may also include a light sensor, such as a complementary metal oxide semiconductor (CMOS) or charge-coupled device (CCD) image sensor, for use in imaging applications. In some examples, the sensor component 2514 may also include an accelerometer sensor, a gyroscope sensor, a magnetic sensor, a pressure sensor, or a temperature sensor.

The communication component 2516 is configured to facilitate communication, wired or wirelessly, between the apparatus 2500 and other devices. The apparatus 2500 can access a wireless network based on a communication standard, such as WiFi, 2G, or 3G, or a combination thereof. In one example, the communication component 2516 receives a broadcast signal or broadcast associated information from an external broadcast management system via a broadcast channel. In one example, the communication component 2516 further includes a near field communication (NFC) module to facilitate short-range communications.

In examples, the apparatus 2500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer readable storage medium including instructions, such as included in the memory 2504, executable by the processor 2520 in the apparatus 2500, for performing the above-described methods. For example, the non-transitory computer-readable storage medium may be a ROM, a random access memory (RAM), a compact disc read-only memory (CD-ROM), a magnetic tape, a floppy disc, an optical data storage device, and the like.

A non-transitory computer-readable storage medium is provided. When an instruction in the storage medium is executed by a processor 2520 of the apparatus 2500, the apparatus 2500 is enabled to perform the above multimedia resource management method.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only.

It will be appreciated that the disclosure is not limited to the exact construction that has been described above and illustrated in the accompanying drawings, and that various modifications and changes can be made without departing from the scope thereof.

The invention claimed is:

1. A multimedia resource management method, comprising:
when a copy instruction for a first multimedia resource is received, displaying a first floating window, the first floating window displaying the first multimedia resource in a thumbnail form;
when a movement instruction for the first floating window is received, changing a position of the first floating window based on an acquired movement; and
when a release instruction for the first floating window is received, performing a management operation on the first multimedia resource within the first floating window, wherein performing the management operation comprises:
when the release instruction is received after the first floating window is moved to a location of a resource collection container, storing the first multimedia resource to the resource collection container,
displaying the resource collection container and the first multimedia resource sequentially in a first screen edge area; and
when a moving instruction for one or more multimedia resources into the resource collection container to form a floating window queue including at least two floating windows, displaying, in the first screen edge area, the resource collection container outside of the floating window queue; and
when a movement instruction for the resource collection container and the floating window queue is received, displaying the resource collection container and the floating window queue in a second screen edge area, wherein the first floating window is displayed in the second screen edge area after the copy instruction is received.

2. The method of claim 1, wherein when the preset trigger instruction for the first multimedia resource is received, displaying the first floating window comprises at least one of following acts:
when a floating instruction for the first multimedia resource is received, displaying the first floating window, the floating instruction being generated after the first multimedia resource is pressed for a duration longer than a preset duration;
when a download instruction for the first multimedia resource is received, displaying the first floating window; and
when a copy instruction for the first multimedia resource is received, displaying the first floating window.

3. The method of claim 2, wherein when the floating instruction for the first multimedia resource is received, displaying the first floating window comprises:
when the first multimedia resource is a voice resource, performing voice recognition on the voice resource after the floating instruction is received, and displaying the first floating window containing an obtained voice recognition result.

4. The method of claim 1, wherein the movement instruction comprises a first movement instruction, and when the movement instruction for the first floating window is received, changing the position of the first floating window based on the acquired movement trajectory comprises:

when a first gesture operation is detected, displaying an information interaction page of a target application, the information interaction page being a page for information interaction with a sharing object with which the first multimedia resource is to be shared; and
when the first movement instruction is received, changing the position of the first floating window on the information interaction page based on an acquired first movement trajectory; and
wherein the release instruction comprises a first release instruction, and when the release instruction for the first floating window is received, performing the management operation on the first multimedia resource within the first floating window comprises:
when the first release instruction is received, sending the first multimedia resource to the sharing object.

5. The method of claim 4, further comprising:
displaying an entry for deletion on the information interaction page; and
when a deletion instruction for the first floating window is received at a location of the entry for deletion, deleting the first floating window.

6. The method of claim 1, wherein the movement instruction comprises a second movement instruction, and when the movement instruction for the first floating window is received, changing the position of the first floating window based on the acquired movement trajectory comprises:
when a second gesture operation is detected, displaying the first floating window on a first screen, and displaying an information interaction page of a target application on a second screen; and
when the second movement instruction is received, moving the first floating window from the first screen to the second screen based on an acquired second movement trajectory; and
wherein the release instruction comprises a second release instruction, and when the release instruction for the first floating window is received, performing the management operation on the first multimedia resource within the first floating window comprises:
when the second release instruction is received, sending the first multimedia resource to a sharing object with which the first multimedia resource is to be shared for information interaction.

7. The method of claim 1, further comprising:
displaying at least one application shortcut entry,
wherein the release instruction comprises a third release instruction, and when the release instruction for the first floating window is received, performing the management operation on the first multimedia resource within the first floating window comprises:
when the third release instruction is received after the first floating window is moved to a location of an application shortcut entry of a target application, displaying an information interaction page of the target application, and sending the first multimedia resource to a sharing object with which the first multimedia resource is to be shared for information interaction.

8. The method of claim 1, further comprising:
when a movement instruction for the first floating window of the floating window queue is received on an information interaction page of a target application, moving the first floating window on the information interaction page, and displaying, on the first floating window, an identifier used to prompt for sending; and
when a release instruction for the first floating window is received after the first floating window is moved out of the floating window queue, sending, the first multimedia resource within the first floating window to a sharing object with which the first multimedia resource is to be shared for information interaction.

9. The method of claim 1, wherein when the preset trigger instruction for the first multimedia resource is received, displaying the first floating window comprises:
when the first multimedia resource is a text resource and the text resource comprises a key word, performing semantic analysis on the text resource after a copy instruction for the text resource is received, to obtain at least one key word; and
displaying the first floating window containing the at least one key word.

10. A multimedia resource management apparatus, comprising:
a processor;
a display screen; and
a memory configured to store an instruction executable by the processor,
wherein the processor is configured to:
when a copy instruction for a first multimedia resource is received, cause the display screen to display a first floating window, the first floating window displaying the first multimedia resource in a thumbnail form;
when a movement instruction for the first floating window is received, change a position of the first floating window based on an acquired movement trajectory; and
when a release instruction for the first floating window is received, perform a management operation on the first multimedia resource within the first floating window, wherein the processor is further configured to:
when the release instruction is received after the first floating window is moved to a location of a resource collection container, store the first multimedia resource to the resource collection container,
display the resource collection container and the first multimedia resource sequentially in a first screen edge area; and
when a moving instruction for one or more multimedia resources into the resource collection container to form a floating window queue including at least two floating windows, displaying, in the first screen edge area, the resource collection container outside of the floating window queue; and
when a movement instruction for the resource collection container and the floating window queue is received, display the resource collection container and the floating window queue in a second screen edge area, wherein the first floating window is displayed in the second screen edge area after the copy instruction is received.

11. The multimedia resource management apparatus of claim 10, wherein when the preset trigger instruction for the first multimedia resource is received, to display the first floating window, the processor is configured to:
when a floating instruction for the first multimedia resource is received, cause the display screen to display the first floating window, the floating instruction being generated after the first multimedia resource is pressed for a duration longer than a preset duration;
when a download instruction for the first multimedia resource is received, cause the display screen to display the first floating window; and when a copy instruction for the first multimedia resource is received, cause the display screen to display the first floating window.

12. The multimedia resource management apparatus of claim 11, wherein when the floating instruction for the first multimedia resource is received, to display the first floating window, the processor is configured to:
when the first multimedia resource is a voice resource, perform voice recognition on the voice resource after the floating instruction is received, and cause the display screen to display the first floating window containing an obtained voice recognition result.

13. The multimedia resource management apparatus of claim 10, wherein the movement instruction comprises a first movement instruction, and when the movement instruction for the first floating window is received, to change the position of the first floating window based on the acquired movement trajectory, the processor is configured to:
when a first gesture operation is detected, cause the display screen to display an information interaction page of a target application, the information interaction page being a page for information interaction with a sharing object with which the first multimedia resource is to be shared; and
when the first movement instruction is received, change the position of the first floating window on the information interaction page based on an acquired first movement trajectory; and
wherein the release instruction comprises a first release instruction, and when the release instruction for the first floating window is received, to perform the management operation on the first multimedia resource within the first floating window, the processor is configured to:
when the first release instruction is received, send the first multimedia resource to the sharing object.

14. The multimedia resource management apparatus of claim 10, wherein the movement instruction comprises a second movement instruction, and when the movement instruction for the first floating window is received, to change the position of the first floating window based on the acquired movement trajectory, the processor is configured to:
when a second gesture operation is detected, cause the display screen to display the first floating window on a first screen and to display an information interaction page of a target application on a second screen; and
when the second movement instruction is received, move the first floating window from the first screen to the second screen based on an acquired second movement trajectory; and
wherein the release instruction comprises a second release instruction, and when the release instruction for the first floating window is received, to perform the management operation on the first multimedia resource within the first floating window, the processor is configured to:
when the second release instruction is received, send the first multimedia resource to a sharing object with which the first multimedia resource is to be shared for information interaction.

15. The multimedia resource management apparatus of claim 10, wherein the processor is further configured to:
cause the display screen to display at least one application shortcut entry,
wherein the release instruction comprises a third release instruction, and when the release instruction for the first floating window is received, to perform the management operation on the first multimedia resource within the first floating window, the processor is configured to:

when the third release instruction is received after the first floating window is moved to a location of an application shortcut entry of a target application, cause the display screen to display an information interaction page of the target application, and send the first multimedia resource to a sharing object with which the first multimedia resource is to be shared for information interaction.

16. The multimedia resource management apparatus of claim 10, wherein the processor is further configured to:

when a movement instruction for the first floating window of the floating window queue is received on an information interaction page of a target application, move the first floating window on the information interaction page, and display, on the first floating window, an identifier used to prompt for sending; and when a release instruction for the first floating window is received after the first floating window is moved out of the floating window queue, send, the first multimedia resource within the first floating window to a sharing object with which the first multimedia resource is to be shared for information interaction.

17. A non-transitory storage medium having stored thereon computer program instructions that, when executed by a processor, cause the processor to implement a multimedia resource management method, the method comprising:

when a copy instruction for a first multimedia resource is received, displaying a first floating window, the first floating window displaying the first multimedia resource in a thumbnail form;

when a movement instruction for the first floating window is received, changing a position of the first floating window based on an acquired movement trajectory; and when a release instruction for the first floating window is received, performing a management operation on the first multimedia resource within the first floating window, wherein performing the management operation comprises:

when the release instruction is received after the first floating window is moved to a location of a resource collection container, storing the first multimedia resource to the resource collection container, displaying the resource collection container and the first multimedia resource sequentially in a first screen edge area; and when a moving instruction for one or more multimedia resources into the resource collection container to form a floating window queue including at least two floating windows, displaying, in the first screen edge area, the resource collection container outside of the floating window queue;

when a movement instruction for the resource collection container and the floating window queue is received, displaying the resource collection container and the floating window queue in a second screen edge area, wherein the first floating window is displayed in the second screen edge area after the copy instruction is received.

* * * * *